(12) United States Patent
Behnert

(10) Patent No.: US 6,866,341 B2
(45) Date of Patent: Mar. 15, 2005

(54) VEHICLE SEAT FOR AIRCRAFT AND MOTOR VEHICLES

(75) Inventor: Eckhard Behnert, Michelfeld (DE)

(73) Assignee: Recaro Aircraft Seating GmbH & Co. (DE)

(*) Notice: Subject to any disclaimer, the term of this patent is extended or adjusted under 35 U.S.C. 154(b) by 0 days.

(21) Appl. No.: 10/182,136

(22) PCT Filed: Jan. 19, 2001

(86) PCT No.: PCT/EP01/00609
§ 371 (c)(1),
(2), (4) Date: Jul. 26, 2002

(87) PCT Pub. No.: WO01/54941
PCT Pub. Date: Aug. 2, 2001

(65) Prior Publication Data
US 2003/0075966 A1 Apr. 24, 2003

(30) Foreign Application Priority Data
Jan. 27, 2000 (DE) .......................... 100 03 407

(51) Int. Cl.[7] ............................ A47C 20/00; A47C 7/50
(52) U.S. Cl. ........................... 297/423.26; 297/423.28; 5/944
(58) Field of Search ....................... 297/423.26, 423.28, 297/423.3, 423.18, 423.1, 423.12; 5/944

(56) References Cited

U.S. PATENT DOCUMENTS

| 375,448 | A | * | 12/1887 | Hayward ............ 297/423.28 X |
|---|---|---|---|---|
| 4,455,050 | A | * | 6/1984 | Kubek ................ 297/423.28 X |
| 5,039,167 | A | * | 8/1991 | Sweet ................ 297/423.28 X |
| 5,255,957 | A | * | 10/1993 | Opsvik et al. ......... 297/423.12 |
| 5,302,003 | A |   | 4/1994 | Xenofos |
| 5,352,020 | A | * | 10/1994 | Wade et al. ............ 297/423.26 |
| 5,447,359 | A | * | 9/1995 | Asbjornsen et al. ... 297/423.26 X |
| 5,490,821 | A | * | 2/1996 | Wu ............................ 5/944 X |
| 5,507,562 | A | * | 4/1996 | Wieland ............ 297/423.26 X |
| 5,725,281 | A | * | 3/1998 | Vairinen ................ 297/423.26 |
| 5,890,766 | A | * | 4/1999 | Tsai ....................... 297/423.28 |
| 6,095,610 | A | * | 8/2000 | Okajima et al. ..... 297/423.26 X |
| 6,199,234 | B1 | * | 3/2001 | Srour et al. ................. 5/944 X |
| 6,264,278 | B1 | * | 7/2001 | Weimer et al. ........ 297/423.26 |
| 6,321,402 | B1 | * | 11/2001 | Ming-Chung .............. 5/944 X |
| 6,523,202 | B2 | * | 2/2003 | Loomos ..................... 5/944 X |
| 2003/0080597 | A1 | * | 5/2003 | Beroth et al. ....... 297/423.26 X |

FOREIGN PATENT DOCUMENTS

| DE | 40 16 687 A1 | 11/1991 |
|---|---|---|
| DE | 4016687 | 11/1991 |
| DE | 691 13 045 T2 | 5/1996 |
| DE | 69113045 | 5/1996 |
| EP | 0543050 | 5/1993 |
| FR | 2371169 | 6/1978 |
| JP | 08080230 | 3/1996 |
| JP | 11318631 | 11/1999 |
| JP | 2166037 | 11/2000 |
| WO | 9201409 | 2/1992 |
| WO | WO 92/01409 A1 | 2/1992 |

* cited by examiner

Primary Examiner—Rodney B. White
(74) Attorney, Agent, or Firm—Roylance, Abrams, Berdo & Goodman L.L.P.

(57) ABSTRACT

A vehicle seat for aircraft and motor vehicles, includes a back rest (10) and a seat part (14) supported by a seat frame connected to a vehicle floor. One support arm (40) pivotally supports on one of its ends a combined foot (42) and leg support (44) as separate surfaces of a bracing component (45). The support arm (40) is coupled to the seat frame (20) at its other free end in a pivotable manner and may be adjusted detent-wise through preset positions. The foot (42) and the leg support (44) are arranged on opposite faces of the support piece (45).

9 Claims, 4 Drawing Sheets

VEHICLE SEAT FOR AIRCRAFT AND MOTOR VEHICLES

FIELD OF THE INVENTION

The present invention relates to a vehicle seat for aircraft and motor vehicles with a back rest and a seat component retained by a seat frame support connected to the vehicle floor. One support arm has pivotably mounted on its one free end a combined foot and leg rest, as opposite surfaces of a bracing component. The foot rest is employed exclusively in one pivoting position. The leg rest is employed in another pivoting position.

BACKGROUND OF THE INVENTION

Vehicle seats, air passenger seats or motor passenger seats in particular, are known in a plurality of embodiments. Modern vehicle seats have a large number of possible settings for the seat component and the back rest. In addition, good upholstery and arm rests increasing comfort are currently included in the standard.

Regarding leg comfort, however, much remains to be desired. While high-quality vehicle seats such as are used in first class or business class, also have leg rests, the leg and foot area has below it in its entirety one support surface as an integral component of the seat. Only because of cost and space considerations, these conventional solutions are not employed for standard areas, such as the economy class in aircraft or for standard seating in commercial vehicles such as buses.

A vehicle seat of the type in question is disclosed in EP-B-0539444. In this conventional layout of a bracing component, the latter supports the entire lower leg, including the foot area, of a seat occupant. The conventional bracing component is connected on both sides to a support arm. Each support arm is hinged to the seat frame support, pivotably and in assignable positions. Individual rest elements are integrated into the interior of the combined foot and leg rest. These rest elements may be folded out from a flat initial position to positions at various angles. The feet of a seat occupant may be placed in different positions at different elevations on the conventional bracing component. Because of the large number of movable and adjustable parts, this solution is a complex and costly in application. Despite the large number of potential settings, a particular setting is inflexibly assigned to the occupant of the seat, so that the latter must of necessity remain with a mandatory setting for a protracted period.

DE-A-4016687 discloses a generic seat layout in vehicles, passenger vehicles in particular, having a seat movably mounted in a vehicle and a pivoting back rest opposite this seat component. The conventional seat may be adjusted between a reclining position and a semi-kneeling position. The back rest is movable between a vertical position and a reclining position on a common seating axis which is fastened non-rotatably transversely to the longitudinal axis, and more or less adjustably in the longitudinal direction of the vehicle. Secured on the floor of the vehicle, in front of the seat, is a leg rest which may be moved to different swivel positions for use as a foot, shin, or lower leg rest. The bracing component involved may be vertically adjusted by a longitudinally adjustable support arm. The upper support surface facing away from the floor of the vehicle assumes the support function exclusively for all the referred leg areas. By an energy accumulator in the form of an elastic component, the bracing component is held in a base position as calf support with a number of possible pivot positions. The conventional bracing component may be moved from this base position against the force of the energy accumulator to another one of a number of possible pivot positions, so that the seat occupant may rest in a kneeling position with the front of his leg below the knee joint on the bracing component. Consequently, the conventional layout allows the seat occupant to assume a half-kneeling sitting position in a vehicle, something otherwise known only in the office furniture area. Since the support arm is to be connected to the floor of the vehicle in the area of one of the free ends of the arm, this conventional solution is also bulky in design and costly in production.

SUMMARY OF THE INVENTION

Objects of the present invention are to provide improved vehicle seats for aircraft and motor vehicles with seating comfort increased in the foot and/or leg area, without requiring an appreciable amount of additional space or increased cost.

The foregoing objects are provided when a single support arm is coupled by one free end to the seat frame support and may be locked in assignable positions. The foot and leg rests are mounted each on opposite surfaces of the bracing component pivotally couple the other support arm end. In the areas of the legs of a seat occupant, which require especially efficient support, a combined foot and leg support may be achieved which increases seating comfort and relieves the seat occupant of the task of completing "seating work." Since both a foot rest and a leg rest are created with only one support component on its opposite surfaces, the solution involved may also be applied cost effectively and with conservation of space. A contribution to this solution is also made by the circumstance that the support arm with integrated foot and/or leg rest preventing, as demonstrated in the state of the art, supporting of an entire leg as a sort of couch, accompanied by formation of a total supporting surface.

In addition, an ergonomically obvious adaptation of the bracing component to the human leg may be achieved by the pivotable and lockable support arm with bracing component, since the rest involved may be adjusted immediately at possible pivoting positions. Even seat occupants who differ widely from each other in physical size, especially as regards body length, always find an easily adaptable seat structure. Consequently, exclusively the foot rest is formed in one embodiment of the potential pivot positions, preferably in the form of a calf rest. As a result, the rest in question with its bracing component may be polyfunctional in design.

In a preferred embodiment of the vehicle seat of the present invention, the support arm with the foot and/or leg rest is mounted to the rear below the back rest on the seat frame support, but preferably on the front side in the leg area of the seat occupant. In the last-named embodiment, it is also possible for the leg rest to be designed as a calf rest and to combine its function with that of a separate foot rest, which is then to be mounted on the back of the seat frame support structure of the vehicle seat in front.

An especially space-saving design is obtained if only one support arm is provided, one which is pivot-connected in its center to the foot or leg rest. Preferably, two retaining flanges opposite each other are present through which extends a shaft of the support arm. Between the retaining flanges, the free end of the support arm is received. The bottom side of the support arm may, in this instance preferably, be in the form of a stop surface for the foot rest.

A definitive support for feet placed on the rest is guaranteed by the stop surface.

In another preferred embodiment of the vehicle seat of the present invention, the foot rest is provided with raised areas such that a sort of massage function is performed for the particular seat occupant. In this way, the comfort of the seat occupant is distinctly improved, especially in the event of protracted occupation of the seat during an airplane or bus trip.

In another preferred embodiment of the vehicle seat of the present invention, two shanks are mounted at an assignable angle to each other. The shank facing toward the seat frame support is pivot-connected to the seat frame support by a rotary element with a locking feature. In addition to a space-saving design, this embodiment also guarantees that the support arm with the foot and/or leg rest may be swung to the full extent downward to take the rest involved completely out of service. In addition, preferably, auxiliary bracing of the seat frame support may additionally be provided for the rotary element with the locking feature.

A reset spring can be provided at the pivot connection point between support arm and rest. During swiveling movement in the direction of the raised foot rest, the pretensioned spring during its resetting movement guarantees power-assisted contact for the particular leg of the seat occupant, so that active support of the calf is achieved.

Other objects, advantages and salient features of the present invention will become apparent from the following detailed description, which, taken in conjunction with the annexed drawings, discloses a preferred embodiment of the present invention.

BRIEF DESCRIPTION OF THE DRAWING

Referring to the drawings which form a part of this disclosure.

DETAILED DESCRIPTION OF THE INVENTION

Figure 1:
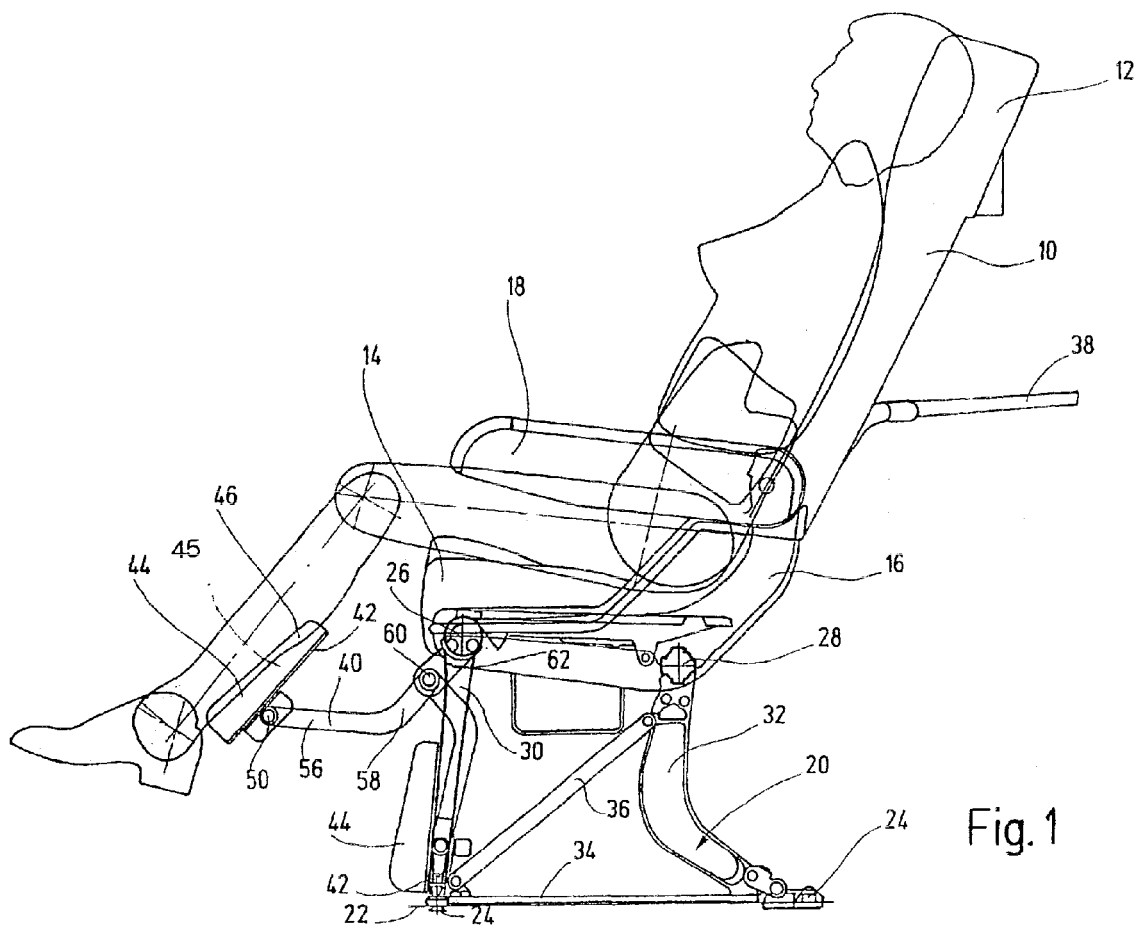
FIG. 1 is a side elevational view of a vehicle seat, particularly an aircraft seat, with the leg rest activated according to an embodiment of the present invention.

The vehicle seat, an aircraft seat in particular, shown in FIG. 1 has an adjustable-inclination back rest 10 with integrated head rest 12. In its lower part, back rest 10 effects transition to the seat component or thigh rest 14, in which a female occupant, represented in outline, has been seated in the seat illustrated. The seat component 14 is accommodated by a seat shell 16, preferably of a plastic material, and has at least one tilting arm rest 18. To enhance seating comfort, arm rest 18 is in its lowered passenger position in the illustration in FIG. 1. The seat shell 16 and accordingly the seat component 14 rest on a seat frame support 20 which permits fastening of the vehicle seat to a vehicle floor 22 by suitable fastening means 24. The fastening means, as well as the structure of the seat frame support 20, are conventional and thus will not be described further in detail.

The seat frame support 20 includes a front cross brace 26 and rear cross brace 28 in the area of the back rest 10. The two cross braces 26 and 28 secure the seat shell 16 at the bottom, and thus, the seat component 14 over its entire width. Toward the vehicle floor 22, the two cross braces 26 and 28 are spaced apart by supports 30 and 32 connected to each other on their lower ends by a floor brace 34. A diagonal brace 36, which as viewed in the line of sight to FIG. 1, extends between the lower end of each support 30 and the upper end of each support 32. The seat frame support 20 is preferably a light-weight construction made in particular of aluminum materials.

A folding table 38, which serves the occupant of the following seat as a table top when the vehicle seats are mounted in a row, may be mounted in the rear area of the back rest 10. The design in question as described for vehicle seats, such as that for aircraft passenger seats or passenger seats in commercial vehicles such as buses, is generally known and is not be discussed in detail. In addition to possible adjustments referred to for the back rest 10, other optional seat adjustments may be provided, with respect to the seat component 14 in particular.

In the embodiment shown in the figures, a pivot-mounted and lockable pivot support arm 40 is mounted in assignable positions in the area of the front cross brace 26 on the seat frame support 20. Support arm 40 has both a foot rest 42 and a leg rest 44 in the form of a calf support. Hence, the rest 42/44 is a multipurpose feature, that is, it may be used optionally either for foot support or for leg support, as desired by the current occupant of the seat. The width selected for the rest in question is such that the seat occupant may optionally place one leg or foot, but possibly also both legs or feet on the rests. From the viewpoint of ergonomics, the seat permits dynamic seating by means of this rest, so that increased seating comfort even on long flights or over great road distances is achieved, with space conserved and at low cost. In an embodiment not shown here, as a corresponding modification of the support arm, the rest 42/44 could also be hinge-connected to the rear cross brace 28, so that a seat occupant next in the row of seats might use the rest for his legs. Preference is to be given, however, to the embodiment illustrated in FIG. 1 and FIG. 2. Both the foot rest 42 and the leg rest 44 represent a component of a common bracing component 45. The foot rest 42 is mounted on one surface of the bracing component 45, while leg rest 44 is mounted on the opposite other surface of the bracing component 45. If the leg rest 44 is in the form of a calf rest, the associated area of the bracing component 45 may in addition be shaped so that the requirements of the body outline of the current seat occupant are taken into account.

Figure 2:
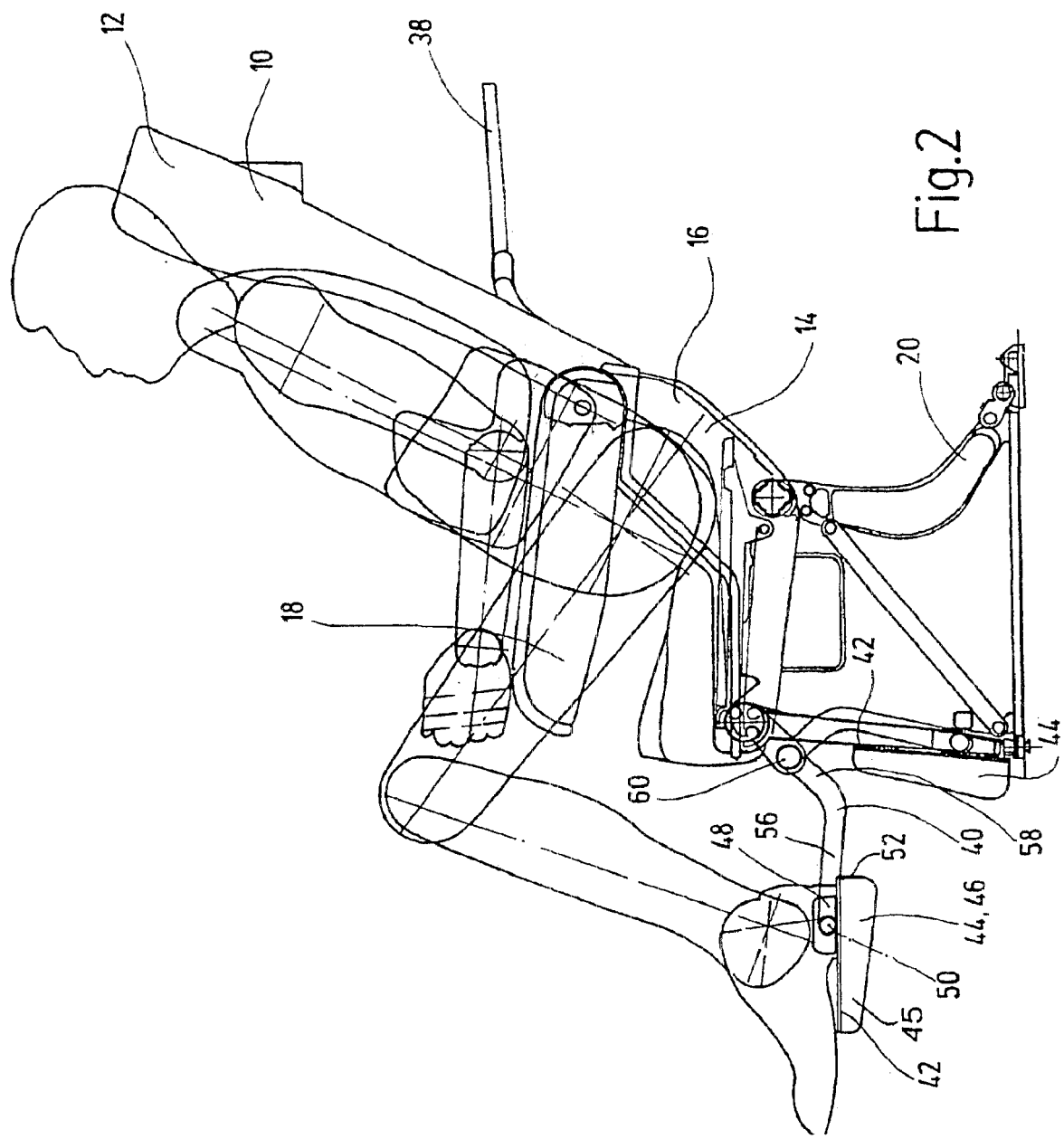
FIG. 2 is a side elevational view of the vehicle seat of FIG. 1 with the foot rest activated.

In the illustration presented in FIG. 1, the rest has been swung to a position in which it acts as a leg rest 44, especially as calf support. The leg rest 44 is accordingly provided with flexible padding 46 which results in greater support comfort and yet permits reliable support in the calf area. The illustration presented in FIG. 2 shows a vehicle seat as illustrated in FIG. 1, but one now occupied by a male passenger, the leg rest 44 swung down and the foot rest 42 facing upward as the leg rest 44 with padding 46 faces downward. To achieve reliable support for the foot of the seat occupant, the foot rest 42 is in the form of a solid plate. Damage to the soft padding 46 of the leg rest 44 underneath is prevented. The rest is pivoted on the front end of the support arm 40 to provide for the swinging movement of the rest referred to above.

Figure 3:
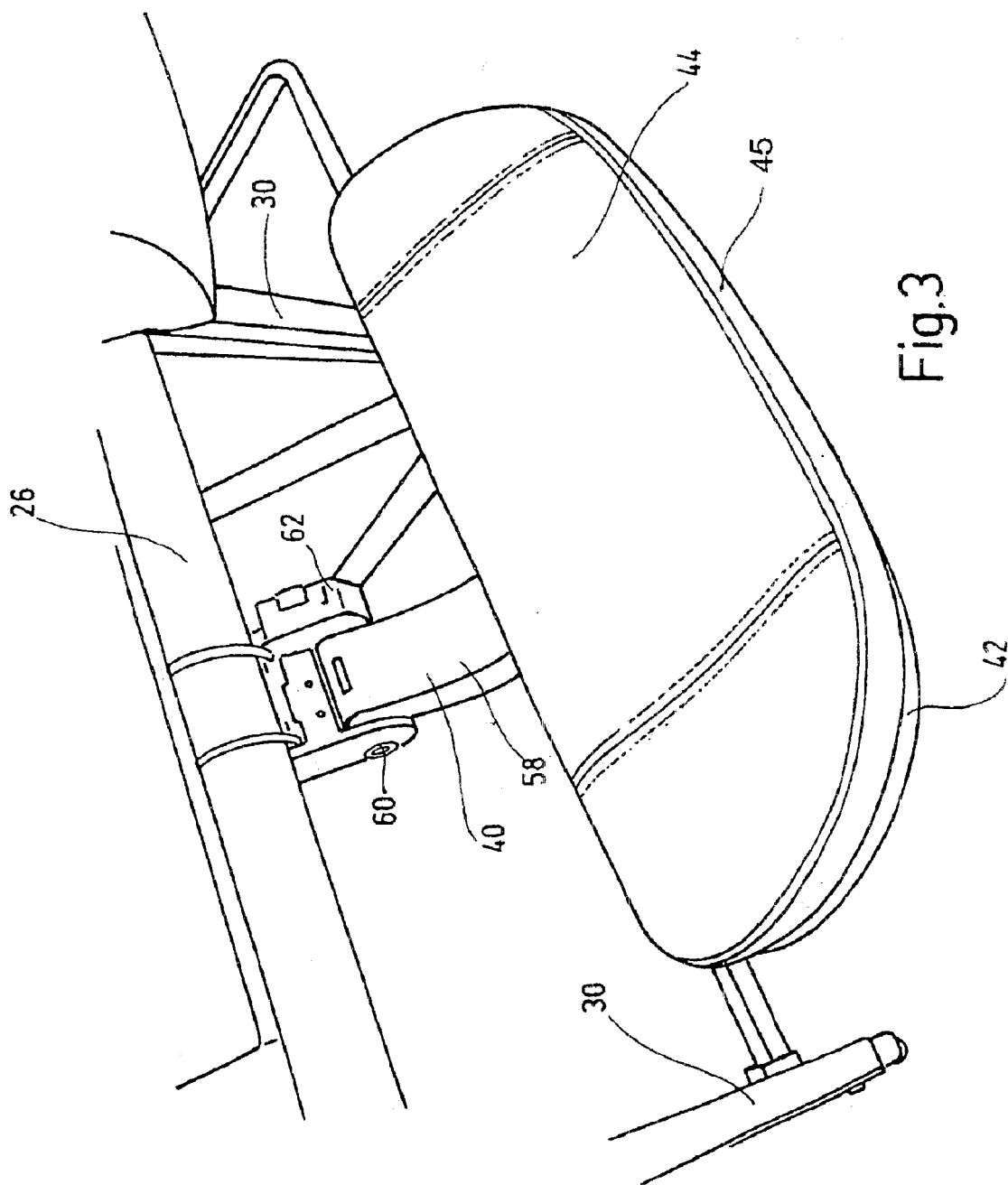
FIG. 3 is an enlarged partial perspective view of the vehicle seat of FIG. 1 with the leg rest available.
Figure 4:
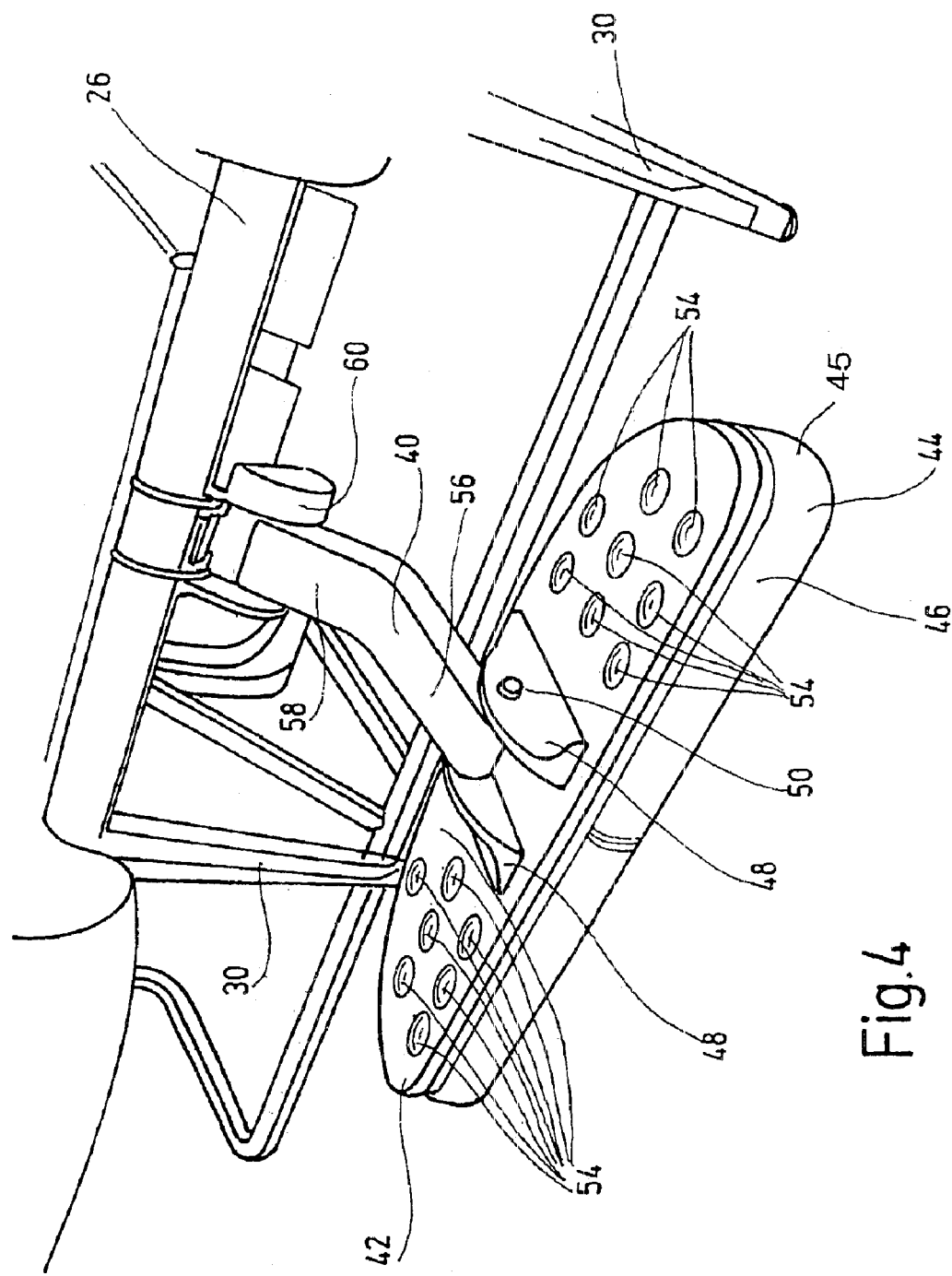
FIG. 4 is an enlarged partial perspective view of the vehicle seat of FIG. 1 with the foot rest available.

The support arm 40, as particularly shown in FIGS. 3 and 4, is pivotally mounted centrally on the foot or leg rest 42,44. For the pivotable connection, side two retaining flanges 48 are mounted opposite each other on the foot rest 42. A shaft 50 of the support arm 40 extends through flanges 48 so that the free end of the support arm 40 is held between them. The respective retaining flanges 48 divide the foot rest 42 into a right and a left support area for the feet of the seat occupant (see FIG. 2). In the area of the shaft 50, spring elements (not shown) may be mounted between the rests 42,44 and the support arm 40, so that in both instances the respective support for the leg or foot is spring loaded and the tilt of the rest is automatically adjusted to the ergonomics of the seat occupant. The support process involved is in each instance spring-assisted. The spring assistance may also be present exclusively to assist leg support or foot support.

As seen in FIG. 2 in particular, the bottom side of the support arm 40 presents a stop surface 52 for the foot rest 42. As is also to be seen in FIG. 4, the plate-like foot rest 42 is provided with knob-like raised areas 54 which permit a sort of massage function in the event that the seat occupant has removed his/her shoes and uses the foot rest 42 accordingly. As FIG. 2 also shows, the shaft 50 is hinge-connected between support arm 40 and rest 42,44 to the support flanges 48 so that the latter are displaced backward slightly relative to the ankle joint of the respective seat occupant. This has been found to be especially user-friendly.

The support arm 40 has two shanks 56 and 58 mounted at an assignable angle to each other. These shanks define between them an obtuse angle, preferably one with a value of 135°. The shank 58 facing toward the seat frame support 20 is hinge-connected or pivoted to the latter by way of a rotary element 60 with an integrated locking feature. In the embodiment illustrated in FIGS. 3 and 4, the rotary part 60 with the integrated locking feature is hinge-connected or pivoted directly to the upper front cross-brace 26 of the vehicle seat. Preferably, however, as in the embodiment shown in FIGS. 1 and 2, the rotary element 60 is an integral component of a flange-like coupling piece 62, which in turn is rigidly connected at its end opposite the rotary element 60 to the cross brace 26. As a result of the accompanying projection determined by the coupling flange 62, as is illustrated in FIGS. 1 and 2 in particular, the support arm 40 with rests 42,44 may be swung backward in the direction of the pair of front supports 30 so that the rest can be positioned behind the front edge of the seat of the seat element 40. If the rest is needed again, it may be returned or pivoted clockwise to a service position from the storage position shown in FIGS. 1 and 2 into which the rest was swung away counterclockwise. The support arm 40 with rests 42,44 may be stopped in a specific position by way of the rotary element 60 with integrated locking feature divided into specific steps.

The locking feature in the steps referred to may have subdivisions such that a virtually continuous setting is guaranteed for the rests 42,44. The support arm 40 with associated rests 42,44, in turn, may be designed as a lightweight structure, preferably made of an aluminum material, this being a significant factor especially in aircraft construction. Because of the mounting of the rests 42,44 to be pivotable around the shaft 50 and in view of the plurality of pivot positions in relation to the rotary element 60, a large number of options for adaptation to the particular seat occupant are provided and may be changed during operation. A distinct increase in seating comfort in the sense of dynamic seating is achieved. In addition, the arrangement of the present invention is well suited for a resting position of the seat occupant, for example, when the occupant is sleeping. Because of the complete pivoting away of the rests by way of the support arm 40, these rests are not in the occupant's way if the occupant does not need them. In the event of an accident, these rests may be securely stored away, and thus, contain no accident risk. The arrangement illustrated is suitable especially in view of its space-saving design for aircraft passenger seats and for seats in commercial vehicles such as buses.

While one embodiment has been chosen to illustrate the invention, it will be understood by those skilled in the art that various changes and modifications can be made therein without departing from the scope of the invention as defined in the appended claims.

What is claimed is:

1. A vehicle seat for aircraft and motor vehicles, comprising:

a back rest;

a seat component;

a frame supporting said back rest and said seat component and being connectable to a vehicle floor;

only a single support arm having first and second opposite ends, said first end pivotally connected to said frame to move between various pivoted positions and be locked in one of said pivoted positions, said support arm having first and second shanks oriented at an angle relative to one another and extending from said first and second ends, respectively, said first shank being pivotally mounted to said frame by a rotary component with a locking mechanism; and a bracing component pivotally coupled at a center portion thereof to said second end of said support arm for movement between first and second positions, said bracing component having a foot rest and a leg rest on opposite surfaces of said bracing component, in said first position said foot rest being exposed for use, in said second position said leg rest being exposed for use.

2. A vehicle seat according to claim 1 wherein said support arm and said bracing component are mounted on one of a rearward portion of said frame beneath said back rest and a forward portion of said frame in a leg area of a seat occupant.

3. A vehicle seat according to claim 1 wherein said support arm and said bracing component are mounted on a forward portion of said frame in a leg area of a seat occupant.

4. A vehicle seat according to claim 1 wherein said leg rest is a calf rest.

5. A vehicle seat according to claim 1 wherein said foot rest comprises first and second retaining flanges spaced opposite one another, said second end of said support arm being received between said retaining flanges; and a shaft extends from said support arm and through said retaining flanges.

6. A vehicle seat according to claim 5 wherein a bottom side of said support arm adjacent said second end thereof forms a stop surface for said foot rest.

7. A vehicle seat according to claim 1 wherein said foot rest comprises raised areas providing a massage function for a seat occupant.

8. A vehicle seat according to claim 1 wherein a coupling element attaches said rotary component to said frame.

9. A vehicle seat according to claim 1 wherein said bracing component pivots through an angle of at least 135° between said first and second positions.

* * * * *